United States Patent [19]
Seastrom

[11] 3,741,450
[45] June 26, 1973

[54] COMPARTMENT ORGANIZER
[75] Inventor: Wesley D. Seastrom, La Canada, Calif.
[73] Assignee: Seastrom Manufacturing Co., Inc., Glendale, Calif.
[22] Filed: Sept. 17, 1971
[21] Appl. No.: 181,451

[52] U.S. Cl............ 224/42.42 R, 312/108, 312/111
[51] Int. Cl. ............................................. B60r 5/02
[58] Field of Search .................. 224/29 R, 42.42 R, 224/42.45 R; 312/242, 108, 111, 107

[56] References Cited
UNITED STATES PATENTS

| 1,625,011 | 4/1927 | Wolfe et al. | 224/42.42 R X |
| 2,871,080 | 1/1959 | Shelly | 312/111 X |
| 3,592,344 | 7/1971 | Schade | 312/108 X |
| 2,582,812 | 1/1952 | Wise | 312/242 |

Primary Examiner—Gerald M. Forlenza
Assistant Examiner—Jerold M. Forsberg
Attorney—Roger A. Marrs

[57] ABSTRACT

An organizer is disclosed herein for storing a plurality of dissimilar articles in an orderly arrangement which includes a plurality of separate and individual storage elements adapted to be selectively arranged with respect to each other for providing a plurality of open pockets intended as storage space. Each storage element includes a U-shaped cross section having opposite sides connected at one end by an integral section piece. The opposing surfaces of the opposite sides and the section piece define an open-sided and open-ended area for insertably receiving articles to be stored. Pressure sensitive adhesive material is employed to secure selected ones of the plurality of storage elements together in a predetermined manner so that the respective openings will readily accommodate insertion of the articles without interference.

5 Claims, 5 Drawing Figures

PATENTED JUN 26 1973
3,741,450
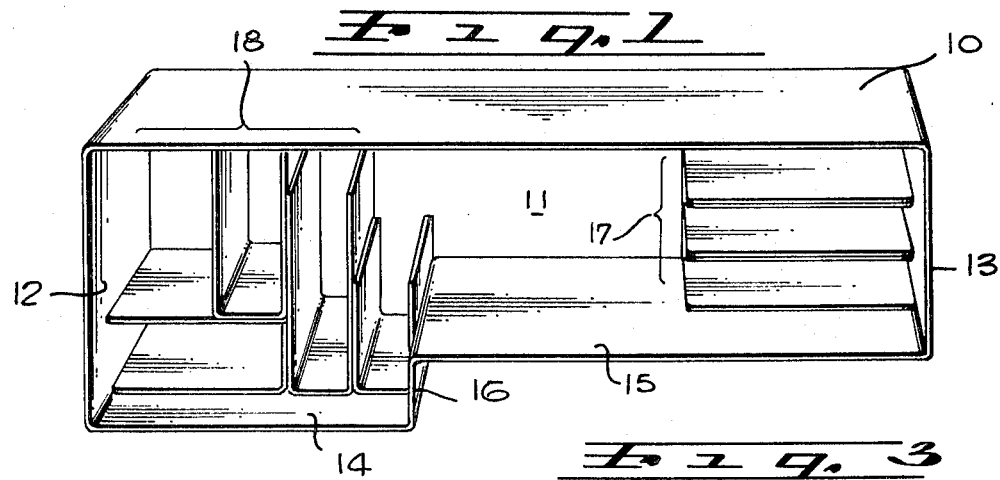
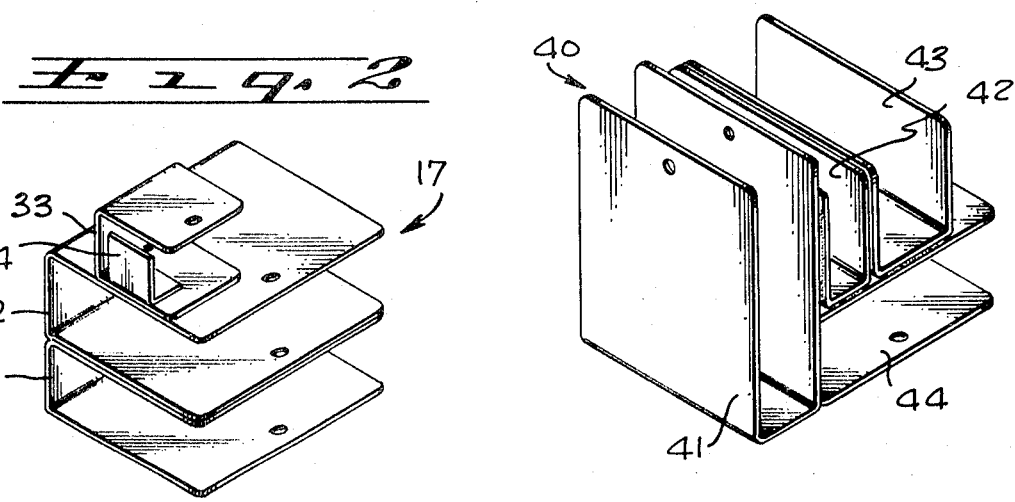
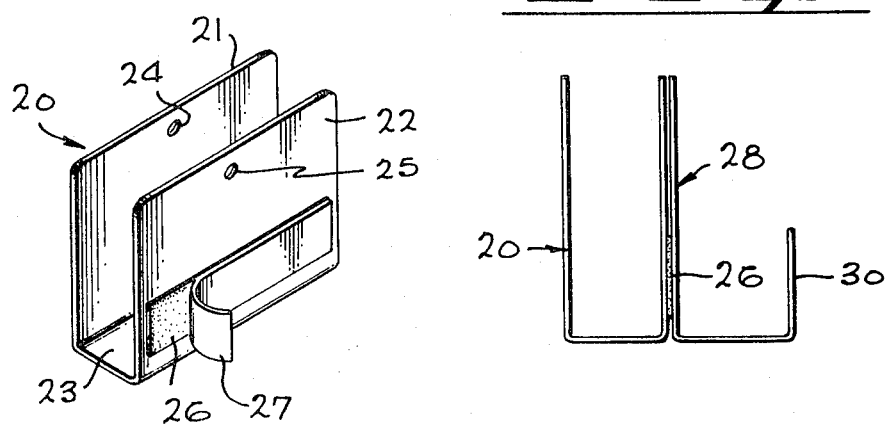
INVENTOR.
WESLEY D. SEASTROM
BY
Roger G. Marrs

COMPARTMENT ORGANIZER

BACKGROUND OF THE INVENTION

1. Field of the Invention

This invention relates to accessories for organizing the storage of miscellaneous personal articles and more particularly to an organizer having a plurality of selectively arrangeable pockets or storage spaces suitable for mounting in the dashboard compartment of a vehicle.

2. DESCRIPTION OF THE PRIOR ART

In the ast, it has been a conventional practice to provide a recess in the dashboard of vehicles such as automobiles for storing small personal items such as sunglasses, credit cards, wallets, combs, brushes or the like for the convenience of the passenger. Generally, the storage compartment is a deep recess in the dashboard which includes a hinged door having a lock thereon that is flushed with the dashboard. The interior of the compartment is open and unrestricted while the walls of the compartment are sometimes irregular in order to accommodate equipment necessary for the operation of the vehicle located behind the dashboard.

Problems have been encountered when using storage compartments of this type which are due to the fact that the various articles or items are not separated and are generally piled on top of one another on the bottom of the compartment. This unorganized arrangement does not present ready accessibility to individual articles being stored and greatly limits the capacity of the compartment for storing a variety of dissimilar articles or items. This is particularly cumbersome when papers are being stored such as maps, vehicle registration certificates, warranty cards and the like.

Some attempts have been made to alleviate this problem by using wire separators and individual partitions which are slideably mounted in the tracks so as to divide the compartment space into subareas or divisions. Such construction is generally expensive, subject to breakage and cannot permit separate arrangement so as to accommodate the particular accessories or items of different size intended to be stored by the user. Therefore, a need has long existed to provide an organizer for dashboard storage compartments which may be arranged to the particular articles intended to be stored by the user and that may be modular in concept so as to provide a plurality of storage spaces of different dimensions that forms a unitary structure.

SUMMARY OF THE INVENTION

Accordingly, the above difficulties and problems are obviated by the present invention which provides a plurality of storage elements that when combined in a selective and predetermined arrangement provide a plurality of storage pockets for receiving individual items or articles. Each pocket is defined by the opposing side surfaces of storage pockets for receiving individual items or articles. Each pocket is defined by the opposing side surfaces of storage elements that are U-shaped in cross section. The plurality of storage elements are secured together in the predetermined arrangement by pressure sensitive material so that a unitary construction is produced. The unitary construction becomes a part of the compartment defined by the dashboard so that alteration or modification to the standard vehicle compartment or dashboard is unnecessary.

Therefore, it is among the primary objects of the present invention is to provide a novel compartment organizer for moudlar installation in a selected arrangement in a compartment of a conventional dashboard.

Another object of the present invention is to provide a novel article or item organizer for vehicle dashboard compartments that may be selectively arranged in a predetermined manner to provide a variety of storage pockets or openings adapted to insertably receive a variety of personal articles.

Still another object of the present invention is to provide a novel vehicle-dashboard compartment organizer composed of a plurality of storage elements that are arranged in combination to provide a plurality of different sized storage pockets or openings seaprated by various wall members of the respective storage elements.

A further object of the present invention is to provide a novel accessory organizer for the dashboard compartment of vehicles that is convenient to install, econimical to produce and readily assembled by unskilled persons.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a perspective view of the organizer of the present invention incorporated into the storage compartment on a typical dashboard of a vehicle;

FIG. 2 is a perspective view of another organizer arrangement composed of a variety of storage elements;

FIG. 3 is a perspective view of another arrangement of storage elements to provide different size storage pockets;

FIG. 4 is a perspective view showing pressure sensitive material carried on a wall surface of a storage element; and FIG. 5 is an end elevational view of a pair of storage elements secured together by the pressure sensitive material.

DESCRIPTION OF THE PREFERRED EMBODIMENT

Referring to FIG. 1, a typical dashboard compartment is illustrated which comprises an integral structure having a top wall 10, a rear wall 11, a pair of opposite side walls 12 and 13, and an irregular bottom wall comprising wall sections 14 and 15. The irregular bottom wall includes adjoining section 16 that connects wall sections 14 and 15. Although only the bottom wall is illustrated as being irregular, it is to be understood that this is for illustrative purposes and that other irregularities in the compartment wall may be formed in the compartment. Also, it is to be understood that the total compartmen is mounted in the dashboard of the vehicle and may include a hinged door for closing off the compartment when not in use.

In combination with the compartment walls, the present invention includes a plurality of storage elements such as grouped together above compartment bottom wall section 15 and as indicated as a module or group by numeral 17. The storage elements in group 17 provide storage areas abetween opposing wall surfaces adapted to insertably receive selected articles or items to be stored. The arrangement or grouping of the storage elements in group 17 are illustrative of one module composed of individual storage elements to be described later.

Another group of storage elements is carried on the compartment bottom section 14 and is illustrated as a module or group by the numeral 18. As described earlier, a plurality of storage areas or pockets are available into which various articles may be insertably received. The group of storage elements 18 are composed of a plurality of individual storage elements and are arranged in a predetermined manner different from the arrangement shown in group 17. Group 18 is arranged in modular fashion so as to occupy the nterior of the compartment associated with the bottom section 14 and connection piece or section 16. This grouping illustrates the invention's ability to conform or take into account various irregularities in the walls of the compartment.

Referring now to FIG. 4 in detail, a single storage element is indicated by numeral 20 which is U-shaped in cross section and includes a pair of walls 21 and 22 having opposing surfaces that define the storage area. Walls 21 and 22 are integrally joined by a section 23. Aligned holes or apertures 24 and 25 are formed in the walls 21 and 22 for aligning the storage elements respective of each other and for hanging the elements on a rod for storage purposes prior to assembly and the exterior wall surfaces of walls 21 and 22 are provided with a pressure sensitive material 26. The pressure sensitive material 26 is temporarily covered by a strip 27 that may be readily removed when it is desired to expose the pressure sensitive material. By means of the material, a plurality of the storage elements may be arranged adjacent one another and secured to each other to provide a modular grouping of storage elements so that the desired arrangement of pockets or storage spaces may be defined.

As shown in FIG. 5, storage element 20 is secured to another storage element indicated by numeral 28 by means of the pressure sensitive material 26. It is also to be noted that the storage element 28 is wider than the width of storage element 20 and that a wall 30 of element 28 is substantially shorter than its opposite wall which provides a substantially different configuration than that of element 20. By providing storage elements of different widths and wall heights, various groupings can be arranged to provide the desired size and dimension of storage area to be defined.

Referring now tin detail to FIG. 2, it can be seen that the plurality of storage elements in roup 17 form a modular construction that may be readily inserted into the storage cavity of the compartment and that by employing the pressure sensitive material, the modular storage elements may be carried on a selected wall of the compartment. The grouping 17 comprises a plurality of storage elements identified by numerals 31, 32 and 33 wherein the adjacent walls of each storage element are secured together by the pressure sensitive material. A section 34, which is L-shaped in cross section, is employed as a wall member to terminate one end of the storage pocket or opening formed by storage element 33. The pockets or storage areas defined by storage elements 31 and 32 are open-sided and open-ended.

In FIG. 3, another alternate arrangement of storage elements is illustrated which are constructed and arranged in a predetermined fashion in accordance with the treachings of the present invention. The module or grouping of storage elements in FIG. 3 is indicated by numeral 40 and comprises elements 41, 42, 43 and 44. It is to be noted that elements 41, 42 and 43 are arranged substantially vertical and that element 44 resides in a horizontal position. Pressure sensitive adhesive secures each of the storage elements together so that a module is produced and the plurality of storage pockets or areas are open for insertably receiving selected articles or items. The module unit 40 may now be inserted into the interior of a storage compartment and secured by the pressure sensitive adhesive.

In view of the foregoing, it can be seen that a modular construction is produced from a plurality of separate and individual storage elements and that each module may be positioned in a suitable location within the storage interior of the compartment. Themodule is constructed to account for wall surface irregularities in the construction of the compartment as well as for providing differences in dimensional size of each storage pocket or area of a storage element. The storage elements are inexpensively produced and may be provided in a packaged disassembled form so that the user may readily select and construct a modular in accordance with his own usage. For example, the user may elect to construct a modular for having pockets to receive glasses, wallets, registration papers, maps or the like according to the users need for storing these articles. The user does not require special skills for assembling these storage elements into a selected module and no tools, equipment or alterations are required to be made to the compartment.

While particular embodiments of the present invention have been shown and described, it will be obvious to those skilled in the art that changes and modifications may be made without departing from this invention in its broader aspects, and therefore, the aim in the appended claims is to cover all changes and modifications as fall within the true spirit and scope of this invention.

What is claimed is:

1. A modular storage construction in combination with a vehicle dashboard compartment having a backwall, opposite sidewalls and a bottom wall defining an open interior comprising:

a plurality of storage elements;

each of said storage elements having opposing wall surfaces defining a slotted storage area for insertably receiving a selected article for storage;

means carried on said storage elements for interconnecting said plurality of storage elements together in a predetermined arrangement to provide a module defining a plurality of open-ended storage pockets opening from one side of said module;

each of said storage pockets constitutes one of said storage areas;

said interconnecting means is a pressure sensitive adhesive;

each of said storage elements is U-shaped in cross section having opposite sidewalls joined at one end by a section piece;

said pressure sensitive material extends along the exterior surface of one of said opposite sidewalls, and said opposite sidewalls are of different dimensional heights measured from said section piece.

2. The invention as defined in claim 1 wherein selected ones of storage elements are L-shaped in cross section.

3. The invention as defined in claim 1 wherein the dimensional height of said sidewalls carried on selected ones of said storage elements are different from the dimensional height of said sidewalls carried on other of said storage elements.

4. The invention as defined in claim 1 wherein said dashboard compartment has at least one of its walls formed in an irregular contour and a plurality of said storage element modules are secured to said compartment walls nested so as to accommodate said irregularly contoured wall.

5. The invention as defined in claim 3 wherein each of said storage elements is a single flat sheet formed into said U-shaped cross section having open sides and an open end.

* * * * *